United States Patent [19]
Yoshimura et al.

[11] Patent Number: 4,732,248
[45] Date of Patent: Mar. 22, 1988

[54] METHOD OF AND APPARATUS FOR CONTROLLING AUTOMATIC CLUTCH

[75] Inventors: Hiroshi Yoshimura; Akira Ohkawa, both of Yokohama, Japan

[73] Assignee: Isuzu Motors Limited, Tokyo, Japan

[21] Appl. No.: 870,874

[22] Filed: Jun. 5, 1986

[30] Foreign Application Priority Data

Jun. 10, 1985 [JP] Japan .................................. 60-125815
Jun. 11, 1985 [JP] Japan .................................. 60-126876

[51] Int. Cl.⁴ ...................... B60K 41/24; B60K 41/28; F16D 67/00
[52] U.S. Cl. .............................. 192/0.055; 192/0.094; 192/13 R
[58] Field of Search ................ 192/0.055, 0.094, 0.09, 192/0.044, 13 R

[56] References Cited

U.S. PATENT DOCUMENTS

| | | | |
|---|---|---|---|
| 1,999,284 | 4/1935 | Colvin | 192/0.055 |
| 3,586,920 | 6/1971 | Wakamatsu et al. | 192/13 R |
| 3,610,362 | 10/1971 | Toyama et al. | 192/13 R X |
| 3,863,730 | 2/1975 | Wakamatsu et al. | 192/13 R X |
| 4,363,389 | 12/1982 | Zannberger et al. | 192/0.094 X |
| 4,509,628 | 4/1985 | Junginger et al. | 192/0.094 |
| 4,630,507 | 12/1986 | Kugler et al. | 192/0.09 X |

FOREIGN PATENT DOCUMENTS

| | | | |
|---|---|---|---|
| 0131411 | 1/1985 | European Pat. Off. | |
| 148349 | 7/1985 | European Pat. Off. | 192/13 R |
| 2415954 | 2/1977 | Fed. Rep. of Germany | |
| 2656888 | 6/1977 | Fed. Rep. of Germany | |
| 3208715 | 9/1983 | Fed. Rep. of Germany | |
| 3447676 | 8/1985 | Fed. Rep. of Germany | |
| 161358 | 10/1982 | Japan | 192/0.055 |
| 173659 | 10/1982 | Japan | 192/13 R |
| 60-8553 | 1/1985 | Japan | |

OTHER PUBLICATIONS

Patent Abstracts of Japan, unexamined applications, M. Field, vol. 9, No. 124, May 29, 1985-the Patent Office Japanese Government, p. 58 M 383, Kokai-No. 60-8553.

Primary Examiner—Rodney H. Bonck
Attorney, Agent, or Firm—Staas & Halsey

[57] ABSTRACT

When the brake pedal on a motor vehicle is depressed, the braking force is detected, and thereafter the speed of rotation of the engine is detected, or the rate of increase of the braking force is detected. Whether the clutch is to be quickly disengaged or not is ascertained on the basis of a combination of the detected braking force and the detected engine speed or the detected rate of increase of the braking force, so that the engine is prevented from being stopped due to, for example, quick depression of the brake pedal.

16 Claims, 14 Drawing Figures

METHOD OF AND APPARATUS FOR CONTROLLING AUTOMATIC CLUTCH

BACKGROUND OF THE INVENTION

1. Field of the Invention

The present invention relates to a method of and an apparatus for controlling an automatic clutch disposed between the engine and the gear transmission on a motor vehicle such as an automobile, and more particularly to a method of and an apparatus for controlling a motor vehicle clutch so that the clutch can quickly be disengaged to prevent the engine from being stopped when a brake pedal is depressed.

2. Description of the Prior Art

As is well known in the art, clutches are employed on motor vehicles for selectively transmitting engine power to driven wheels. With the recent progress of electronic technology, there has been developed an automatic control system for automatically controlling the clutch and the gear transmission on a motor vehicle. Particularly, the clutch and the gear transmission which comprises gears on parallel shafts are driven respectively by hydraulic actuators.

The automatic control system includes an automatic clutch apparatus which controls clutch engagement and disengagement by driving a clutch actuator having a cylinder and a piston for operating a clutch control member. The automatic clutch apparatus comprises an electronic control unit in the form of a microcomputer for driving the clutch actuator in dependence upon operating conditions of the motor vehicle, such as an engine rotation speed, an accelerator pedal position, and other parameters.

More specifically, the electronic control unit of the automatic clutch apparatus is arranged to compute, at all times, the extent to which the clutch is to be engaged, from a signal indicating the engine rotation speed and a signal indicating the accelerator pedal position, and hence to determine the position in which the clutch actuator is to be operated. When starting the motor vehicle, the electronic control unit determines the position in which the clutch is to be operated, from the dpeth to which the accelerator pedal has been depressed and the engine rotation speed, which depth and speed vary from time to time. The electronic control unit thus drives the clutch actuator to move the clutch control member progressively from a clutch-disengaging position through a partly engaging position to a clutch-engaging position, thereby starting to move the motor vehicle smoothly. The clutch is controlled by the electronic control unit also when the gears of the gear transmission are shifted during travel of the motor vehicle.

When the motor vehicle is at rest, the automatic clutch apparatus disengages the clutch to ensure that the engine will not be stopped but idle, since the wheels of the motor vehicle do not rotate. While the motor vehicle is running at an extremely low speed, the electronic control unit controls the clutch so as to be partly engaged to prevent the motor vehicle from being jolted due to the lack of a required torque. When the engine speed or the motor vehicle speed drops below a preset level, the clutch is disconnected to prevent the engine from being suddenly stopped when the brake pedal is depressed.

There has been proposed a clutch control system in which the deceleration of the input shaft of a gear transmission, rather than the engine speed or the motor vehicle speed, is detected, and the clutch is disengaged when the input shaft deceleration is abruptly lowered (see Japanese Laid-Open Patent Publication No. 60-8553), i.e., when there is an increased rate of the decrease in speed. According to this proposed clutch control system, as shown in FIG. 13 of the accompanying drawings, the speed of rotation of an engine 101 (or the speed, measured by a sensor 104, of rotation of an input shaft 105 of a synchromesh gear transmission 103 to which engine power is transmitted via a clutch 102) is progressively reduced, or the deceleration (i.e., the rate of reduction of the speed of rotation of the input shaft 105 per unit time) of the engine 101 is progressively increased after the brake pedal has been depressed, and the deceleration reflects the extent to which the brake pedal is depressed. Based on these characteristics, the clutch 102 is disengaged when the deceleration is higher than a preset level. Rotative drive power from the gear transmission 103 is transmitted through its output shaft 106 and a differential gear 107 to driven wheels 108 of a motor vehicle. When the driver abruptly brakes the motor vehicle, the clutch is disconnected at an earlier stage to prevent the engine from being stopped, since the input shaft 105 reaches a deceleration limit more quickly than when the motor vehicle is ordinarily braked.

The former conventional clutch control system is effective when the motor veicle is decelerated slowly, but fails to disengage the clutch 102 quickly enough when the motor vehicle is rapidly decelerated, resulting in engine stoppage. More specifically, when the accelerator pedal is released and the brake pedal is depressed relatively slowly, the engine 101 will not be stopped by disengaging the clutch 102 upon detection of the engine speed being lowered to the preset level (500 rpm). However, when the brake pedal is abruptly depressed to brake the motor vehicle quickly or when the wheel tires slip on a slippery road such as a snow-covered road and the wheels are locked by being braked, it takes a relatively long time for the electronic control unit to detect a reduction in the speed of the engine 101 and the motor vehicle down to the preset level and to get the clutch 102 to be actually operated, during which time the engine speed is quickly lowered, since the braking operation is quick, with the result that the engine 101 will be stopped before the clutch 102 is disengaged.

With the latter clutch control arrangement, as shown in FIG. 14 of the accompanying drawings, the reduction in the speed of rotation of the input shaft 105 per unit time ($t_0$) is detected when the brake pedal is depressed, and the clutch 102 is quickly disconnected to prevent the engine 101 from being stopped when the detected reduction rate is higher than a preset level. When the motor vehicle runs on an ordinary road and is braked, the input shaft speed is lowered as shown by the curve a, and the reduction rate Ra is lower than the preset level. This means that the input shaft speed is reduced relatively gradually, and the clutch 102 is disengaged while the engine 101 is in operation. Since the input shaft speed is not lowered substantially to zero within the time period required until the clutch 102 is actually disconnected after the control system starts its operation, the engine 101 is prevented from being stopped. When the motor vehicle travels over a slippery road such as snow-covered road with a low coefficient of friction, the wheels are apt to be locked easily when braked, causing the input shaft speed to be decreased abruptly, so that its speed reduction rate or deceleration Rb becomes higher than the preset level. Because the time required for the input shaft 105 to be stopped at such deceleration Rb is shorter than the time for the clutch 102 to be completely disengaged, the engine 101 has already been stopped when the clutch 102 is disengaged.

SUMMARY OF THE INVENTION

It is an object of the present invention to provide a method of and an apparatus for controlling an automatic clutch on a motor vehicle so that the engine of the motor vehicle will not be stopped even when the brake pedal thereof is quickly depressed.

Another object of the present invention is to provide a method of and an apparatus for controlling an automatic clutch on a motor vehicle so that the engine of the motor vehicle will not be stopped even when the brake pedal thereof is quickly depressed, irrespectively of whether the motor vehicle is loaded, not loaded, heavy, or light.

Still another object of the present invention is to provide a method of and an apparatus for controlling an automatic clutch on a motor vehicle so that when the brake pedal of the motor vehicle is depressed while the motor vehicle is on a road, such as a snow-covered road, having a small coefficient of friction with respect to the wheel tires of the motor vehicle, the engine of the motor vehicle will be prevented from being stopped by detecting the braking force and quickly disengaging the clutch based on a combination of the detected braking force and the separately detected speed of rotation of the engine of the motor vehicle.

According to the present invention, there are provided a method of and an apparatus for controlling an automatic clutch disposed between the engine and the gear transmission on a motor vehicle. After the braking force is detected upon depression of a brake pedal, the speed of rotation of the engine or the speed at which the brake pedal is depressed is detected. Whether the clutch is to be quickly disengaged is ascertained on the basis of a combination of the detected braking force and the speed of rotation of the engine or the speed of depression of the brake pedal, so that the engine will be prevented from being stopped due to the depression of the brake pedal.

Heretofore, the clutch has been disengaged by detecting when the speed of rotation of the engine or the speed of travel of the motor vehicle is lowered below a preset level, or by detecting when the reduction rate or deceleration of the speed of rotation of an input shaft is increased higher than a preset level. According to the present invention, however, the clutch is quickly disconnected by detecting an increase in the braking force or the braking speed and detecting when such an increase exceeds a preset level, thus preventing the engine from being stopped. Therefore, the engine will not be stopped when the motor vehicle is braked.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
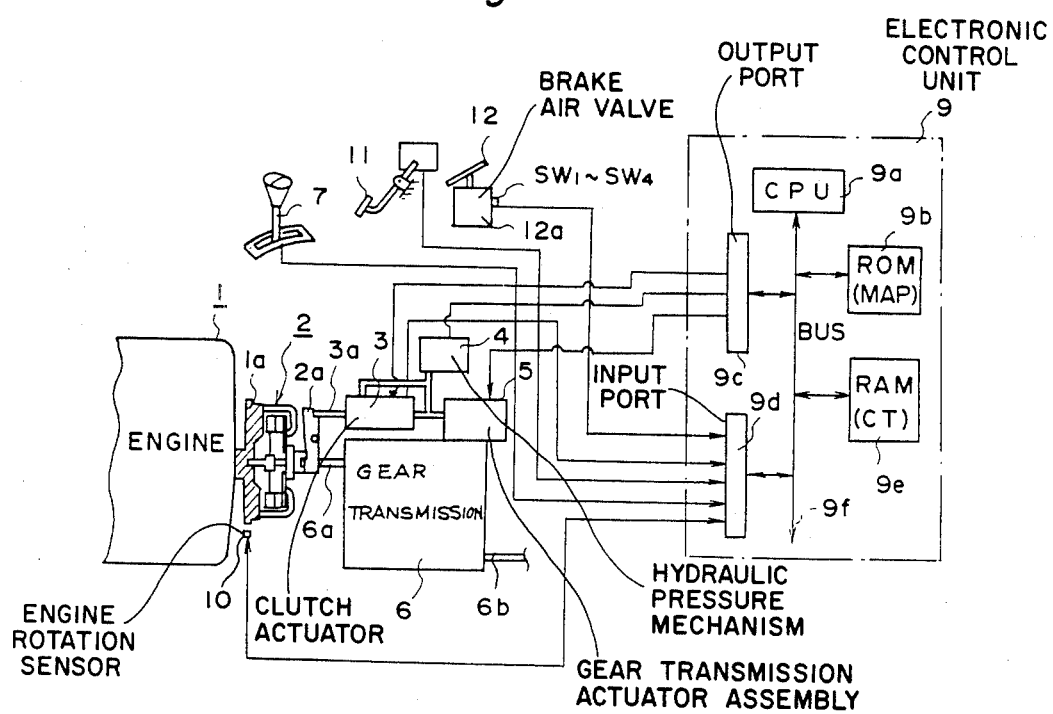
FIG. 1 is a schematic diagram of a clutch control system according to an embodiment of the present invention.

As shown in FIG. 1, a clutch control system according to the present invention is used in combination with a motor vehicle having a gasoline engine 1 including a throttle valve (not shown) for controlling the amount of an intake medium (such as air or an air-fuel mixture), the engine 1 having a flywheel 1a coupled to its crankshaft. The engine 1 is not limited to a gasoline engine, but may be a diesel engine. The flywheel 1a is coupled to a clutch 2 of the known dry-type single-plate design having a release lever 2a. A hydraulically operated clutch actuator 3 having a cylinder and a piston; includes a plurality of solenoid-operated valves for controlling itself. To control the extent to which the clutch 2 is to be engaged, the solenoid-operated valves are selectively opened and closed to move the piston for enabling its piston rod 3a to drive the release lever 2a. The clutch actuator 3 is supplied with hydraulic pressure from a hydraulic pressure mechanism 4. A gear transmission actuator assembly 5 includes an actuator for shifting gears and an actuator for selecting gears. A gear transmission 6 comprises gears on parallel shafts and is operated by the gear transmission actuator assembly 5 for changing the gears. The gear transmission 6 has an input shaft 6a coupled to the clutch 2 and an output (drive) shaft 6b. A selector lever 7 which is operated by the driver has an "N" range (neutral position), a "D" range (automatic gear shift), a "1" range (first gear position), a "2" range (second gear position), a "3" range (automatic gear shift between first, second and third gear positions), and an "R" range (reverse gear position). These ranges can be selected by the position of the lever. Position signals from the selector lever 7 are read into an electronic control unit (described below). The selector lever 7 is generally movable in and along a straight slot, as shown, for selecting the ranges, but may be movable in the pattern of "H" for selecting the ranges.

The flywheel 1a has a plurality of teeth on and around its outer circumferential surface. An engine rotation sensor 10 is disposed adjacent to the flywheel 1a for detecting the speed of rotation of the engine 1 from the number of flywheel teeth that have passed the engine rotation sensor 10 per unit time. The electronic control unit, generally designated at 9, includes a processor (CPU) 9a for effecting arithmetic operations, a read-only memory (ROM) 9b for storing a control program for controlling the gear transmission 6, a control program for controlling the clutch 5, and data such as a control map, an output port 9c, an input port 9d, a random-access memory (RAM) 9e for storing the results of the arithmetic operations and other data, and an address data bus (BUS) 9f interconnecting the processor 9a, the ROM 9b, the output port 9c, the input port 9d, and the RAM 9e. The output port 9c is connected to the clutch actuator 3, the hydraulic pressure mechanism 4, and the gear transmission actuator 5 and issues signals for driving these actuators and mechanism.

The input port 9d is connected to the engine rotation sensor 10, the selector lever 7, an accelerator pedal 11, the clutch actuator 3, and a brake pedal 12 for receiving detected signals from these sensor, lever, actuator and pedals. The depth to which the accelerator pedal 11 is depressed is read into the electronic control unit 9 through the input port 9d. The brake pedal 12 is associated with a brake air valve 12a and, when depressed, operates the brake air valve 12a for supplying a brake with a braking air pressure commensurate with the depth to which the brake pedal 12 is depressed.

Figure 2:
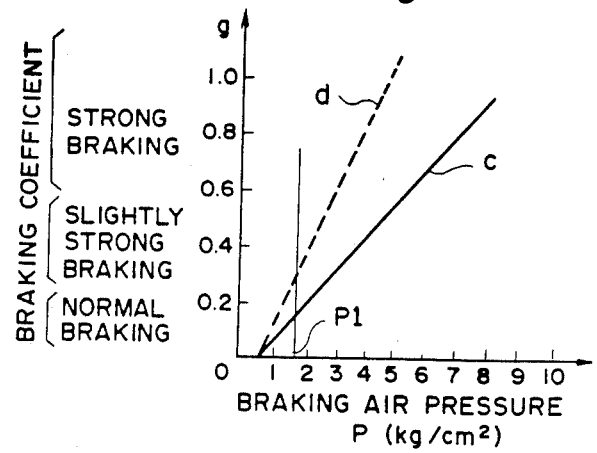
FIG. 2 is a graph showing the relationship between the braking air pressure and the braking force.

The principles of the present invention will be described with reference to FIG. 2. The graph of FIG. 2 is drawn by plotting a braking coefficient g (on the vertical axis) against the braking air pressure P ($kg/cm^2$) (on the horizontal axis) determined by the depth to which the brake pedal 12 is depressed, for the condition in which the motor vehicle carries a large load (line c) and the condition in which the motor vehicle carries no load (line d). A point P1 on the horizontal axis indicates a braking air pressure at which the wheels of the motor vehicle are locked on a road with a small coefficient of friction with respect to the wheels, such as a snow-covered road.

As can be understood from FIG. 2, the braking coefficient g, i.e., the braking force, can be divided into three modes or stages: "normal braking mode", "slightly strong braking mode", and "strong braking mode". When the brake pedal 12 is quickly and deeply depressed by the driver, the brake air valve 12a is opened to a large extent to apply a large braking force to the brake in the strong braking mode. If the clutch 2 is immediately disengaged in this condition to prevent the engine from being stopped, no problem occurs irrespective of whether the motor vehicle carries a large load or no load. In the slightly strong mode or the normal mode, if the clutch 2 were disconnected to prevent the engine from being stopped on a road with a low coefficient of friction with respect to the wheels, the clutch 2 would always be disconnected each time the brake would be depressed while the motor vehicle is running on an ordinary road with a normal coefficient of friction. To avoid this problem, the clutch 2 is quickly disengaged on the basis of a combination of the braking force and the speed of rotation of the engine 1.

Figure 3:
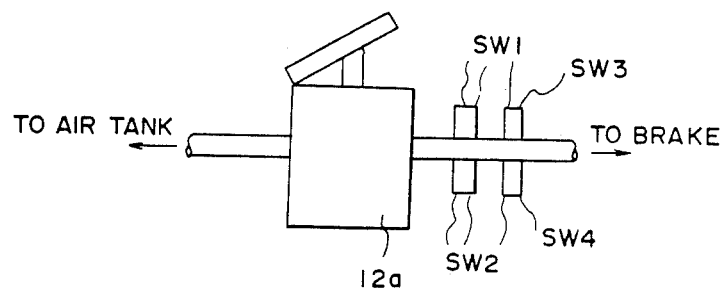
FIG. 3 is a schematic diagram, of air pressure switches for detecting the air pressure of a brake air valve, in the clutch control system illustrated in FIG. 3.
Figure 4:
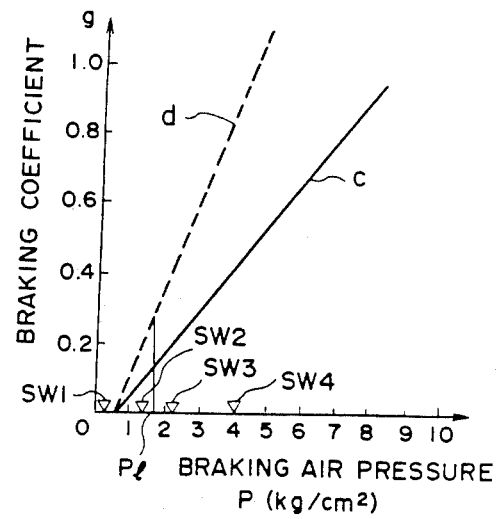
FIG. 4 is a graph, similar to FIG. 2, for explaining preset pressures of the air pressure switches.

As shown in FIG. 2, the braking force is proportional to the depth to which the brake pedal 12 is depressed, i.e., the braking air pressure P. According to the present invention, a plurality (four in the illustrated embodiment of FIG. 3) of air pressure switches SW1 through SW4 are associated with the output passage of the brake air valve 12a which is connected to the brake, the air pressure switches SW1 through SW4 being capable of detecting different braking air pressures. In addition, the engine rotation sensor 10 is associated with the engine 1. The clutch 2 is controlled for its quick disengagement based on the combination of the detected speed of rotation of the engine 1 and the output signals from the air pressure SW1 through SW4. The air pressures at which the air pressure switches SW1 through SW4 are operated are selected as follows:

SW1: 0.3 ($kg/cm^2$)

SW2: 1.2 ($kg/cm^2$)

SW3: 2.3 ($kg/cm^2$)

SW4: 4.0 ($kg/cm^2$)

on both sides of the air pressure P1 at which the wheels are locked while running on a road with a low coefficient of friction. The air pressure setting (4.0 $kg/cm^2$) for the air pressure switch SW4 is high enough to produce a sufficient braking pressure.

An operation sequence for disengaging the clutch will be described with reference to FIG. 5.

Figure 5:
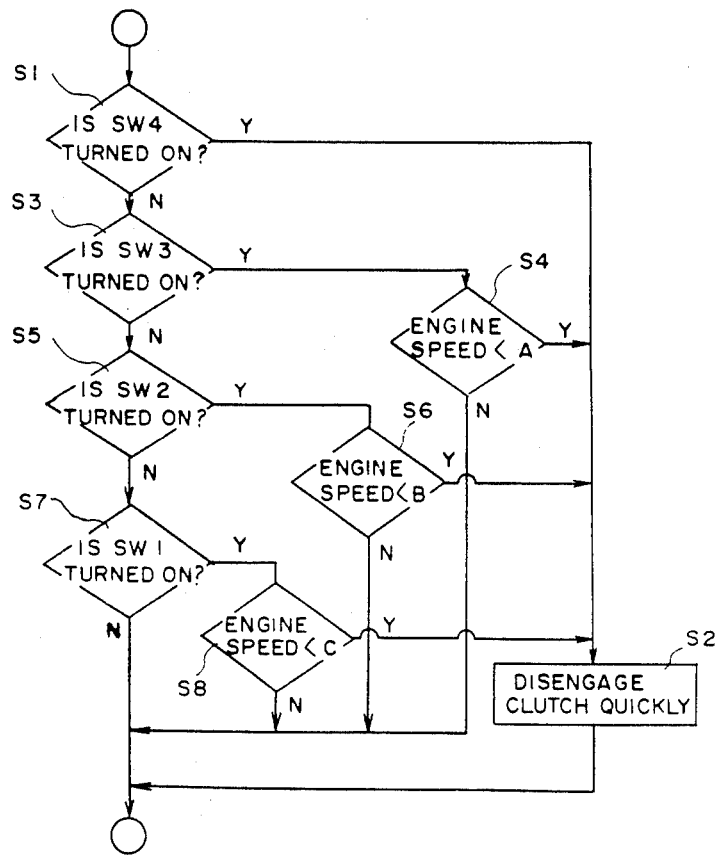
FIG. 5 is a flowchart for a process according to an embodiment of the present invention.

(1) When the brake pedal 12 of FIG. 1 is depressed by the driver to stop the motor vehicle, the electronic control unit 9 detects such depression of the brake pedal 12 based on a signal from the air pressure switch SW1, for example, and starts executing the process sequence of the flowchart of FIG. 5. The electronic control unit 9 first ascertains whether the air pressure switch SW4 is operated or not in a step S1.

If the air pressure switch SW4 is turned on, its signal is applied via the input port 9d and the BUS 9f to the CPU 9a. In case the brake pedal 12 is deeply depressed to strongly brake the motor vehicle, no trouble will take place even if the clutch 2 is immediately disconnected. Thus, the program goes to a step S2 in which the CPU 9a issues a clutch release signal through the output port 9c to the clutch actuator 3 to release or disconnect the clutch 2.

(2) If the air pressure switch SW4 is not in operation in the step S1, the program goes to a step S3 which ascertains whether the next air pressure switch SW3 is operated or not. If the air pressure switch SW3 is operated, it is determined that the brake pedal 12 has been depressed under a considerably large force to stop the motor vehicle in the slightly strong braking mode, and the program goes to a step S4. The step S4 compares the speed of rotation of the engine 1 with a preset level or a value A. If the engine speed is lower than the preset value A, then it is determined that the load on the engine 1 is abruptly increased by the braking of the motor vehicle and the engine 1 would be stopped under the increased load. Therefore, the electronic control unit 9 issues a command to the clutch actuator 3 to disconnect the clutch 2 quickly in the step S2.

If the speed of rotation of the engine 1 is higher than the preset value A in the step S4, it is determines that the load on the engine 1 is not so increased by the braking of the motor vehicle. Therefore, the clutch 2 is not disconnected, but the operation of the electronic control unit 9 leaves the flow of FIG. 5 from the step S4.

(3) If the air pressure switch SW3 is not in operation in the step S3, then the program proceeds to a step S5 which ascertains whether the next air pressure switch SW2 is operated or not. If the air pressure switch SW2 is in operation, then it is determined that the brake pedal 12 is depressed under a considerable force and the motor vehicle is to be quickly stopped in the normal braking mode, and the program goes to a step S6. The step S6 compares the engine speed with a preset value B which is slighly lower than the preset value A. If the engine speed is lower than the preset value B, the electronic control unit determines that the load on the engine 1 due to the braking of the motor vehicle is quickly increased and the engine 1 would be stopped under the increased load. Thus, the electronic control unit 9 immediately issues a command to the clutch actuator 3 to disconnect the clutch 2 immediately in the step S2.

If the speed of rotation of the engine 1 is not lower than the preset value B in the step S6, it is determined that the load on the engine 1 is not so increased by the braking of the motor vehicle. Therefore, the clutch 2 remains connected, and the program leaves the flowchart of FIG. 5 from the step S6.

(4) If the air pressure switch SW2 is not operated in the step S5, then the program proceeds to a step S7 which ascertains whether the next air pressure switch SW1 is operated or not. If the air pressure switch SW1 is in operation in the step S7, then it is determined that the brake pedal 12 is depressed under an ordinary force and the motor vehicle is to be quickly stopped in a "weak braking mode", and the program goes to a step S8. The step S8 compares the engine speed with a preset value C which is slighly lower than the preset value B. If the engine speed is lower than the preset value C, the electronic control unit determines that the load on the engine 1 due to the braking of the motor vehicle is quickly increased and the engine 1 would be stopped under the increased load. Thus, the electronic control unit 9 immediately issues a command to the clutch actuator 3 to disconnect the clutch 2 immediately in the step S2.

If the speed of rotation of the engine 1 is not lower than the preset value C in the step S8, it is determined that the load on the engine 1 is not so increased by the braking of the motor vehicle. Therefore, the clutch 2 remains connected, and the program leaves the flowchart of FIG. 5 from the step S8.

As an alternative to the aforesaid embodiment, a single air pressure switch; rather than the plurality of air pressure switches; and an air pressure sensor may be employed.

Figure 6:
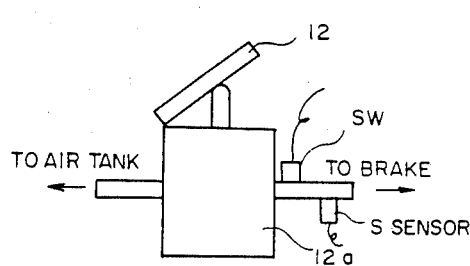
FIG. 6 is a schematic diagram similar to FIG. 3, showing a modified arrangement in which an air pressure sensor is added for detecting the air pressure of the brake air valve.

More specifically, as illustrated in FIG. 6, an air pressure switch SW which operates under a pressure setting of 0.3 kg/cm$^2$; and an air pressure sensor S are associated with the output passage of the brake air valve 12a.

Figure 7:
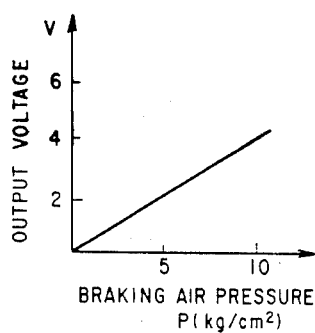
FIG. 7 is a graph showing the output characteristics of the air pressure sensor.

The air pressure sensor S detects the braking air pressure P as an output voltage (V) as shown in FIG. 7.

Figure 8:
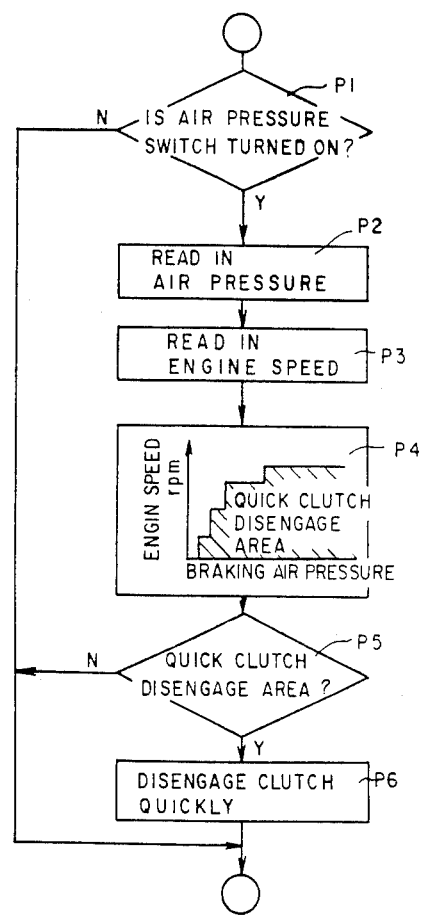
FIG. 8 is a flowchart for a process according to the modified arrangement of FIG. 6.

Operation of the modified arrangement shown in FIG. 6 will be described with reference to FIG. 8.

When the brake pedal 12 is depressed to turn on the air pressure switch SW in a step P1, the CPU 9a reads the air pressure detected by the air pressure sensor S into the RAM 9e in a step P2. The CPU 9a also reads the engine speed detected by the engine rotation sensor 10 into the RAM 9e in a step P3. The CPU 9a then searches a map of braking air pressures P and engine speeds, stored in the ROM 9b, to ascertain whether the read braking air pressure and the read engine speed belong to a quick clutch disengage area in the map, in a step P4. If the read data are determined to be in the quick clutch disengage area in a step P5, then the CPU 9a applies a clutch release signal through the output port 9c to the clutch actuator 3 to release or disconnect the clutch 2 in a step P6. If the read data are not in the quick clutch disengage area, then the clutch 2 is not disengaged, and the operation of the electronic control unit 9 goes out of the flow of FIG. 8.

According to another embodiment, the clutch 2 can smoothly be disengaged to prevent the engine 1 from being stopped when the brake pedal 12 is quickly and deeply depressed by the driver, as in an emergency. This embodiment will be described below with reference to FIGS. 9 through 12.

Figure 9:
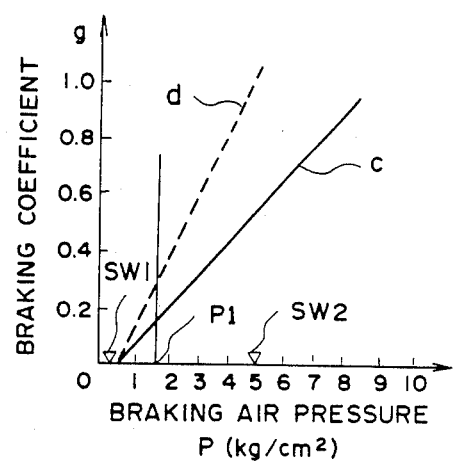
FIG. 9 is a graph, similar to FIG. 2, for explaining preset pressures for air pressure switches according to another embodiment of the present invention.

FIG. 9 is a graph showing a braking coefficient g (on the vertical axis) plotted against a braking air pressure P (kg/cm$^2$) (on the horizontal axis) determined by the depth to which the brake pedal 12 is depressed, for a light motor vehicle (line c) and a heavy motor vehicle (line d). A point P1 on the horizontal axis indicates a braking air pressure at which the wheels of the motor vehicle are locked on a road with a small coefficient of friction with respect to the wheels.

Figure 10:
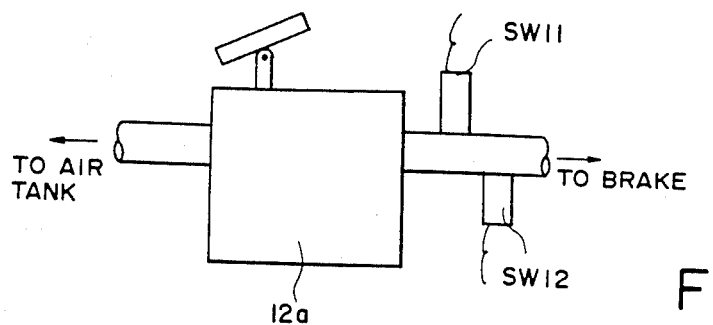
FIG. 10 is a schematic diagram, similar to FIG. 3, showing the air pressure switches for detecting the air pressure of the brake air valve in the embodiment of FIG. 9.
Figure 11:
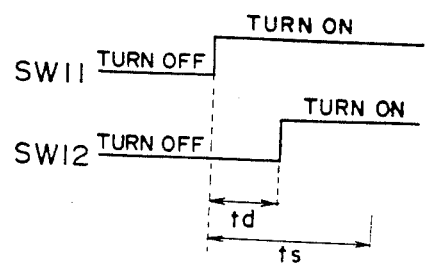
FIG. 11 is a timing chart of operation of the air pressure switches illustrated in FIG. 10.

As shown in FIG. 9, the braking force is proportional to the braking air pressure. As illustrated in FIG. 10, two air pressure switches SW11, SW12 are associated with the output passage of the brake air valve 12a which is connected to the brake. If the time difference td between turn-on times of these switches SW11, SW12 is shorter than a preset value ts as shown in FIG. 11, it is determined that the braking action is panic braking in which the rate of increase in the braking force is large, and the clutch 2 is quickly disconnected. The air pressures at which the air pressure switches SW11, SW12 are turned on are selected as follows:

SW11: 0.3 (kg/cm$^2$)

SW12: 5.0 (kg/cm$^2$)

on both sides of the air pressure P1.

The air pressure setting (5.0 kg/cm$^2$) for the air pressure switch SW12 is high enough to produce a sufficient braking pressure irrespective of the total weight of the motor vehicle, as shown in FIG. 9.

Figure 12:
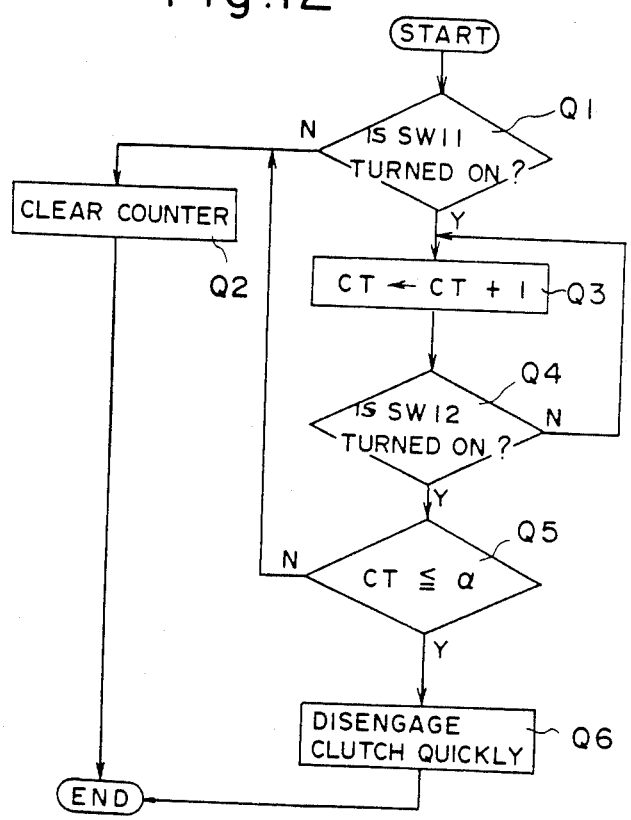
FIG. 12 is a flowchart for a process according to the embodiment of FIG. 9.
Figure 13:
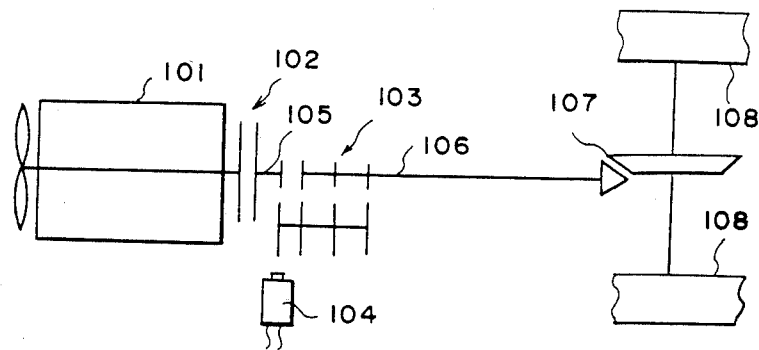
FIG. 13 is a schematic diagram showing a conventional motor vehicle gear transmission in which a clutch is disengaged by detecting the deceleration of an input shaft.
Figure 14:
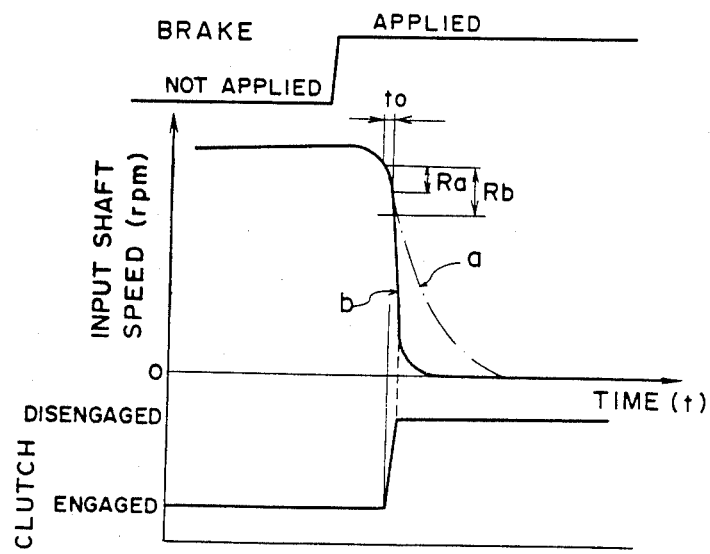
FIG. 14 is a timing chart showing the deceleration of the input shaft of FIG. 13 in relation to brake and clutch operation.

An operation sequence for disengaging the clutch according to this embodiment will be described with reference to FIGS. 11 and 12.

Under an ordinal driving condition in which the brake pedal 11 is not depressed by the driver, the air pressure switch SW11 is turned off. The program goes from a step Q1 to a step Q2 in which a counter in the electronic control unit 9 is cleared to zero, and then leaves the flow of FIG. 12.

If the brake pedal 12 is depressed by the driver and the air pressure switch SW11 is determined to be turned on in the step Q1, a signal from the air pressure switch SW11 is applied via the input port 9d and the BUS 9f to the CPU 9a. The CPU 9a then increments the count of the counter by +1, and stores the count in a counter area CT in the RAM 9e in a step Q3. Thereafter, the program proceeds to a step Q4 which ascertains whether the air pressure switch SW12 is turned on or not. If the air pressure switch SW12 is turned off, the program goes back to the step Q3 so that the counting operation of the counter, and the count storing operation are repeated. During this time, the brake pedal 12 is continuously depressed or more deeply depressed by the driver, and the braking air pressure P continued to increase.

When the braking air pressure P becomes high enough to turn on the air pressure switch SW12, the program goes from the step Q4 to a step Q5 which compares the count CT of the counter with a constant $\alpha$ stored in the RAM 9e in the electronic control unit 9, i.e., a constant used for determining if the braking is quick braking (particularly, panic braking) when the brake pedal 12 is depressed. If the count is greater than the constant $\alpha$, then it is determined the brake pedal 12 is slowly depressed, and it it not necessary to disengage the clutch 2. Therefore, the program returns to the step Q2 in which the count of the counter is cleared to zero. This means that td>ts in FIG. 11.

If the count is equal to or smaller than the constant $\alpha$, then the time difference td between the turn-on times of the air pressure switches SW11, SW12 is equal to or shorter than the preset time ts, and hence it is determined that the braking action is panic braking. Immediately thereafter, the CPU 9a applies a clutch release signal through the output port 9c to the clutch actuator 3 to disengage the clutch 2 quickly in a step Q6.

Instead of programming the above operation sequence in the ROM 9b in the electronic control unit 9, or using microcomputer hardware, discrete circuits or mechanisms may be employed for comparing the time difference td with the preset time ts or for executing the various processing steps described above, as will readily occur to those skilled in the art.

In each of the above embodiments, the brake is operated under air pressure. However, the above clutch control may also be effected by providing a hydraulic brake cylinder operable by the brake pedal and associating pressure switches and a pressure sensor with the hydraulic brake cylinder, as will also readily occur to those skilled in the art.

With the present invention, as described above, the engine is prevented from being stopped when the brake pedal is depressed while the motor vehicle is running on an ordinary road or even on a road such as a snow-covered road having a low coefficient of friction with respect to the vehicle wheels.

Although certain preferred embodiments have been shown and described, it should be understood that many changes and modifications may be made therein without departing from the scope of the appended claims.

What we claim is:

1. An apparatus for controlling an automatic clutch on a motor vehicle having wheels and a brake, to disengage the automatic clutch when the brake is operated, comprising:

an engine for generating rotative power to move the motor vehicle;

a gear transmission for transmitting the rotative power from said engine at a selected gear ratio to the wheels of the motor vehicle;

a clutch, disposed between said engine and said gear transmission, for controlling the transfer of the rotative power from said engine to said gear transmission;

means for detecting a braking force applied to the brake;

means for detecting the speed of rotation of said engine;

means for ascertaining whether the speed of rotation of the engine, corresponding to the detected braking force, is less than a preset value; and means for abruptly disengaging said clutch when said ascertaining means determines that the speed of rotation of the engine corresponding to the detected braking force is less than the preset value.

2. An apparatus according to claim 1, wherein said braking force detecting means comprises means for detecting braking fluid pressure.

3. An apparatus according to claim 2, wherein said braking fluid pressure detecting means comprises means for detecting braking air pressure.

4. An apparatus according to claim 2, wherein said braking fluid pressure detecting means comprises means for detecting braking hydraulic pressure.

5. An apparatus according to claim 1, wherein said braking force detecting means comprises a fluid pressure switch for detecting braking fluid pressure.

6. An apparatus according to claim 1, wherein said braking force detecting means comprises a fluid pressure sensor for detecting braking fluid pressure.

7. an apparatus for controlling an automatic clutch on a motor vehicle having a brake and wheels, to disengage the clutch when the brake is operated, said apparatus comprising:

an engine for generating rotative power to move the motor vehicle;

a gear transmission for transmitting the rotative power from said engine at a selected gear ratio to the wheels of the motor vehicle;

a clutch, disposed between said engine and said gear transmission, for controlling the transfer of the rotative power from said engine to said gear transmission;

means for detecting a braking force applied to the brake;

means for detecting the rate of increase of the braking force;

means for ascertaining whether the rate of increase of the braking force exceeds a preset value; and means for abruptly disengaging said clutch if said ascertaining means determines that the rate of increase of the braking force exceeds a preset value.

8. An apparatus according to claim 7, wherein said rate detecting means comprises means for detecting the rate at which a braking fluid pressure is increased.

9. An apparatus according to claim 1, wherein said braking force detecting means comprises at least two fluid pressure switches which are actuated by respective braking fluid pressures which are greater than and less than a braking fluid pressure at which the wheels of the motor vehicle are locked, said rate detecting means comprising means for detecting when the time difference between turn-on times of said at least two fluid pressure switches is shorter than a preset time after the brake is applied.

10. An apparatus according to claim 7, wherein said braking force detecting means comprises means for detecting braking fluid pressure.

11. An apparatus according to claim 1, wherein said braking fluid pressure detecting means comprises means for detecting braking air pressure.

12. An apparatus according to claim 1, wherein said braking force detecting means comprises means for detecting braking hydraulic pressure.

13. An apparatus according to claim 7, wherein said braking force detecting means comprises a fluid pressure switch for detecting braking fluid pressure.

14. An apparatus according to claim 7, wherein said braking force detecting means comprises a fluid pressure sensor for detecting braking fluid pressure.

15. A method of controlling an automatic clutch on a motor vehicle having a brake, an engine and a gear transmission, to disengage the automatic clutch when the brake is operated, so that the gear transmission is disconnected from the engine, said method comprising the steps of:

(a) detecting a braking force applied to the brake;
(b) detecting the speed of rotation of the engine;
(c) ascertaining whether the automatic clutch is to be disengaged on the basis of the detected braking force and the detected speed of rotation of the engine, corresponding to the detected braking force, is less than a preset value; and
(d) abruptly disengaging the automatic clutch when it is ascertained that the speed of rotation of the engine, corresponding to the detected braking force, is less than the preset value.

16. A method of controlling an automatic clutch on a motor vehicle having a brake, an engine and a gear transmission, to disengage the automatic clutch when the brake is operated, so that the gear transmission is disconnected from the engine, said method comprising the steps of:

(a) detecting a braking force applied to the brake;
(b) ascertaining whether the rate of increase of the detected braking force exceeds a preset value; and
(c) abruptly disengaging the automatic clutch if it is ascertained that the detected rate of increase of the braking force exceeds the preset value.

* * * * *

UNITED STATES PATENT AND TRADEMARK OFFICE
CERTIFICATE OF CORRECTION

PATENT NO. : 4,732,248

DATED : MARCH 22, 1988

INVENTOR(S) : HIROSHI YOSHIMURA ET AL.

It is certified that error appears in the above-identified patent and that said Letters Patent is hereby corrected as shown below:

Col. 1, line 44, "dpeth" should be --depth--.

Col. 2, line 29, "veicle" should be --vehicle--;
       line 58, "a," should be --$\underline{a}$,--.

Col. 4, line 8, "diagram," should be --diagram--;
       line 54, "piston;" should be --piston,--.

Col. 5, line 46, "g" should be --$\underline{g}$--;
       line 51, "c)" should be --$\underline{c}$)--;
       line 52, "d)." should be --$\underline{d}$).--;
       line 58, "g," should be --$\underline{g}$,--.

Col. 6, line 23, after "pressure" insert --switches--.

Col. 7, line 8, "determines" should be --determined--;
       line 22, "slighly" should be --slightly--;
       line 46, "slighly" should be --slightly--;
       line 67, "cm2;" should be --cm$^2$,--.

Col. 8, line 29, "g" should be --$\underline{g}$--;
       line 33, "c)" should be --$\underline{c}$)--;
       line 34, "d)." should be --$\underline{d}$).--.

Col. 9, line 26, "it" (second occurrence) should be --is--.

UNITED STATES PATENT AND TRADEMARK OFFICE
CERTIFICATE OF CORRECTION

PATENT NO. : 4,732,248

DATED : MARCH 22, 1988

INVENTOR(S) : HIROSHI YOSHIMURA ET AL.

It is certified that error appears in the above-identified patent and that said Letters Patent is hereby corrected as shown below:

Col. 10, line 36, "an" (first occurrence) should be --An--;
        line 61, "1," should be --7,--.

Col. 11, line 6, "1," should be --10,--;
        line 9, "1," should be --10,--.

Col. 12, line 3, delete "automatic clutch is to be";
        line 4, delete line in its entirety;
        line 5, delete "force and the".

Signed and Sealed this

Twenty-third Day of August, 1988

Attest:

DONALD J. QUIGG

Attesting Officer

Commissioner of Patents and Trademarks